(12) United States Patent
Doran

(10) Patent No.: US 7,150,670 B2
(45) Date of Patent: Dec. 19, 2006

(54) ENCLOSED VAPOR PRESSURE ROTATION DEVICE

(76) Inventor: Edward Doran, 3344 W. Cuyler, Chicago, IL (US) 60618

( * ) Notice: Subject to any disclaimer, the term of this patent is extended or adjusted under 35 U.S.C. 154(b) by 43 days.

(21) Appl. No.: 11/031,620

(22) Filed: Jan. 8, 2005

(65) Prior Publication Data

US 2006/0154223 A1    Jul. 13, 2006

(51) Int. Cl.
*A63H 29/14* (2006.01)
(52) U.S. Cl. .................. 446/167; 446/176; 434/283
(58) Field of Classification Search .............. 446/199, 446/176, 166, 167, 267; 434/283, 298; 60/675
See application file for complete search history.

(56) References Cited

U.S. PATENT DOCUMENTS

| 0,050,151 A | 9/1865 | Monson |
| 0,242,454 A | 6/1881 | Iske |
| 0,243,909 A | 7/1881 | Iske |
| 0,250,265 A | 9/1881 | Landis |
| 0,250,821 A | 12/1881 | Landis |
| 0,253,868 A | 2/1882 | Iske |
| 0,256,482 A | 4/1882 | Iske |
| 0,271,639 A | 2/1883 | Iske |
| 0,389,515 A | 9/1888 | Iske |
| 2,240,906 A | 6/1941 | Harold |
| 2,398,471 A | 4/1946 | Short et al. |
| 2,402,463 A | 6/1946 | Sullivan |
| 2,513,692 A | 7/1950 | Tubbs |
| 4,509,329 A | 4/1985 | Breston |
| 6,240,729 B1 | 6/2001 | Yoo et al. |

*Primary Examiner*—Kien Nguyen

(57) ABSTRACT

A mechanical toy having two enclosed chambers, one positioned above the other, connected by a tube; a vaporizing medium contained within the enclosed chambers and tube; means for rotationally supporting the tube and chambers; means for exciting the vaporizing medium within the lower chamber to create an increase in vapor pressure within the lower chamber relative to the upper chamber that exerts force upon the vaporizing medium within the lower chamber to communicate the vaporizing medium through the tube into the upper chamber allowing gravity to act upon the upper chamber when a sufficient amount of the vaporizing medium has collected within the upper chamber pulling the upper chamber downward around the means of rotational support.

5 Claims, 4 Drawing Sheets

ENCLOSED VAPOR PRESSURE ROTATION DEVICE

BACKGROUND OF THE INVENTION

1. Field of the Invention

This invention relates in general to a heat engine, and in particular to an engine that transforms heat energy partially into rotating mechanical energy with the assistance of gravity useful in actuating amusement and demonstrating concepts of physics for the purpose of education.

2. Description of the Prior Art

In order to provide background information so that the invention may be completely understood and appreciated in its proper context, reference is made to prior art U.S. patent numbers in the following paragraphs.

U.S. Pat. Nos. 2,402,463; 2,240,906 and 2,398,471 all disclose two chamber novelty power devices capable of partial rotation oscillating about an axis, which operation is effected by evaporative cooling and ambient air temperature. These inventions do not provide the capacity for 360-degree rotation about an axis, nor do they employ the explicit application of an external energy source, in the form of heat, for more clearly demonstrating the concepts of physics employed for device operation, as does the present invention.

The following paragraphs examine a variety of heat engines within the prior art designed with the purpose of producing useful work. Although the present invention is capable of converting heat energy into mechanical energy, the following prior art differs from the present invention principally in that amusement and education are the present invention's primary objects. There are also improvements noted with the present invention that are intended to reduce the device complexity found within the prior art.

While U.S. Pat. No. 242,454 requires a minimum of only one tube connecting a pair of reservoirs for operation; it should be noted that the ends of the tube are connected to the reservoirs at elbows bent in opposing directions to ensure the reservoirs offset each other with respect to the central length of the tube in order to obtain the desired 360-degree unidirectional rotation. The elbows may introduce a higher risk for device failure due to the increased potential for crimping or cracking depending on the material used to compose the tube. The present invention reduces the risk of malfunction by eliminating the elbows thus offering improved functionality while providing 360-degree unidirectional rotation with a minimum of one tube connecting a pair of reservoirs.

U.S. Pat. Nos. 243,909 and 389,515 improve the design of previous art by ensuring that the tube connecting the two reservoirs extends into each reservoir. The improvement was made in part to help maximize the flow of fluid through the tube affected by increased vapor pressure within a given reservoir. The improvement made it necessary to employ additional tubes and reservoirs in order to provide 360-degree unidirectional rotation. The present invention extends the connecting tube into the reservoirs to increase fluid flow with the objective of enhancing amusement; however, it differs from the prior art by utilizing asymmetric reservoirs to provide 360-degree unidirectional rotation without the need for additional tubes and reservoirs thus simplifying the device without compromising functionality.

Within the prior art there are many examples of two chamber heat engines that create a rocking motion. Included in this list are U.S. Pat. Nos. 250,821; 253,868 and 271,639. The present invention differs from the prior art in that the present invention utilizes an axis that enables full rotation and asymmetric chambers that provide 360-degree unidirectional rotation. The asymmetric chambers when filled shift the center of gravity to provide 360-degree unidirectional rotation and inhibit 180-degree oscillation about the axis.

In order to provide 360-degree unidirectional rotation prior art introduces a variety of constructs including additional chambers, gears, valves or pistons. Included in this list are U.S. Pat. Nos. 50,151; 250,265; 256,482; 2,513,692; 4,509,329 and 6,240,729. The extra complexity due to adding chambers is not required by the present invention. The present invention requires a minimum of one pair of chambers connected by a tube. The present invention does not require gears or internal moving parts with the exception of the liquid and gas that is communicated between the chambers as the simplicity of device embodiment is considered essential for enhancing the clarity of operation for educational purposes.

Whatever the precise merits, features and advantages of the above cited references, none of them achieves or fulfills the purposes of the explicit application of an external heat source to provide 360-degree unidirectional device rotation about an axis to actuate amusement and more clearly demonstrate concepts including but not limited to the first and second laws of thermodynamics, Charles' and Boyle's gas laws, the law of gravity, the dynamics of rotational motion and fluid mechanics as does the present invention.

Accordingly, it is a principal object of the present invention to provide a rotation device for amusement and education in the field of science.

It is a further object of the present invention to provide 360-degree device rotation about an axis.

It is a further object of the present invention to provide unidirectional rotation about an axis.

It is a further object of the present invention to achieve device rotation with a minimum of one tube connecting a pair of enclosed reservoirs.

It is another object of the present invention to provide the explicit application of an external energy source, in the form of heat, to generate device rotation.

SUMMARY OF THE INVENTION

This invention relates to an enclosed two chamber rotating device that provides 360-degree rotation useful in actuating amusement and demonstrating concepts of physics for the purpose of education. The rotation is created by a heat source that produces an increase in vapor pressure within one chamber's enclosed space that forces the flow of a liquid within the enclosed space through a hollow communicating member into a second chamber's enclosed space positioned above the former having a lower vapor pressure: When a sufficient amount of liquid is moved from the lower space to the higher space, the higher space will become heavier than the lower space. Gravity acting upon the device will draw the higher space downward around an axis of rotation.

Specifically this device is shown as an enclosed hollow structure with two divided asymmetric spaces connected by an elongated hollow member, in the form of a tube, that extends to an appropriate distance into the interior of each said space. An axis of rotation is maintained between the two spaces perpendicular to the connecting hollow member. The device is arranged in such a manner that one space is located above the other. Initially the lower space will contain a majority of a vaporizing medium in liquid form. A heat source is maintained at the lower space. The upper space being farther from the heat source will have a lower temperature than the lower space. The heat source at the lower space will excite the liquid within the lower space producing an increase in vapor pressure within the lower space relative to the upper space. The increase in vapor pressure will exert force upon the liquid within the lower space to communicate the liquid through the connecting hollow member into the upper space. When a sufficient amount of liquid has collected in the upper space, the upper space will contain more mass than the lower space. The asymmetry of the upper space will cause the liquid to collect in an off center manner creating a weight imbalance within the upper space. Gravity acting upon the upper space will pull it downward around the axis of rotation in the direction of the weight imbalance effectively switching the positions of the upper and lower spaces, hereafter referred to as a cycle. Multiple said cycles produce the capacity for 360-degree unidirectional rotation of the device.

With the above and such other objects in view, as may hereinafter more fully appear, the invention consists of novel construction, combination and arrangement of parts, as will be hereinafter more fully described, and illustrated in the accompanying drawing, wherein are shown embodiments of this invention, but it is to be understood that changes, variations, and modifications may be resorted to which fall within the scope of the invention, as claimed.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
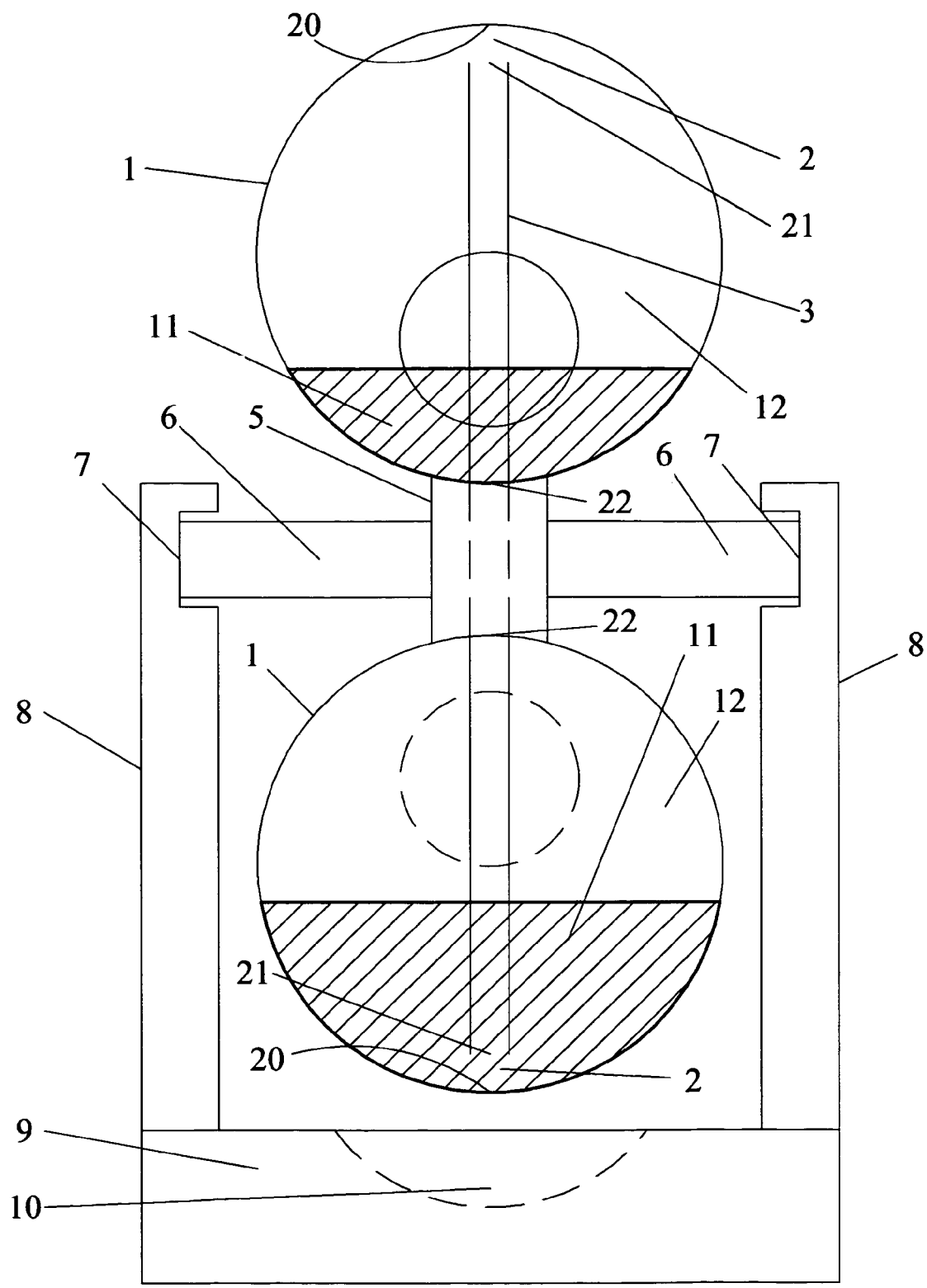
FIG. 1 is a frontal view of an enclosed vapor pressure rotational device in which a hollow member connects two enclosed chambers one above the other each partially filled with a liquid.

A preferred embodiment of the present invention will now be described in connection with FIGS. 1 and 2 of the drawing followed by alternate embodiments with FIGS. 3 and 4 of the drawing.

As shown in FIG. 1 two enclosed chambers 1 also referred to as reservoirs are presented one above the other. By convention the same number is used to identify parts that are identical; for example, the number one is used to identify both the upper and lower chambers. A hollow member 3, in the form of a tube, connects the two chambers. The hollow member extends into each chamber allowing for only a small distance 2 between the open ends 21 of the hollow member and the internal surface 20 of each chamber away from the points of entry 22 into each chamber by the hollow member. A vaporizing medium in the form of a liquid 11 within the lower chamber when heated by a heat source 10 about a base 9 will excite the liquid and increase the vapor pressure within the enclosed space 12 of the lower chamber relative to that which exists within the enclosed space of the upper chamber. The said small distance between the internal surface of the chamber and the open end of the hollow member enables the open end to remain substantially submerged within the liquid to ensure a majority of the liquid is communicated through the hollow member from the lower chamber to the upper chamber as the vapor pressure increases within the lower chamber exerting force upon the liquid within the lower chamber. When a substantial amount of the liquid collects in the upper chamber, gravity acting upon the upper chamber will pull the upper chamber downward around a supporting rotational shaft that defines the axis of rotation 6 and provides 360-degree rotation. The shaft is connected about its center to the hollow member between the two enclosed chambers 5. The shaft is connected at its ends to bearing points 7 that provide 360-degree rotation that are supported by arms 8 connected to the base.

The hollow member and enclosed chambers are preferably comprised of a light transmissive material, such as heat and shatter resistant glass or silica, to promote easy observation of the physical phenomena. The heat source is preferably comprised of a light bulb, such as a 10 to 40 watt incandescent or halogen bulb, to simultaneously illuminate the device while providing heat. The vaporizing medium in the form of a liquid is preferably comprised of material with a low boiling point such as ethanol alcohol or acetone and more preferably of a non-flammable material with said low boiling point such as methylene chloride. The enclosed space within the chambers and connecting hollow member is preferably initially substantially evacuated of air before introducing the vaporizing medium in order to provide vaporization at relatively lower temperatures. The use of lower temperatures, heat and shatter resistant material and non-flammable liquid are preferred for increased operational safety.

Figure 2:
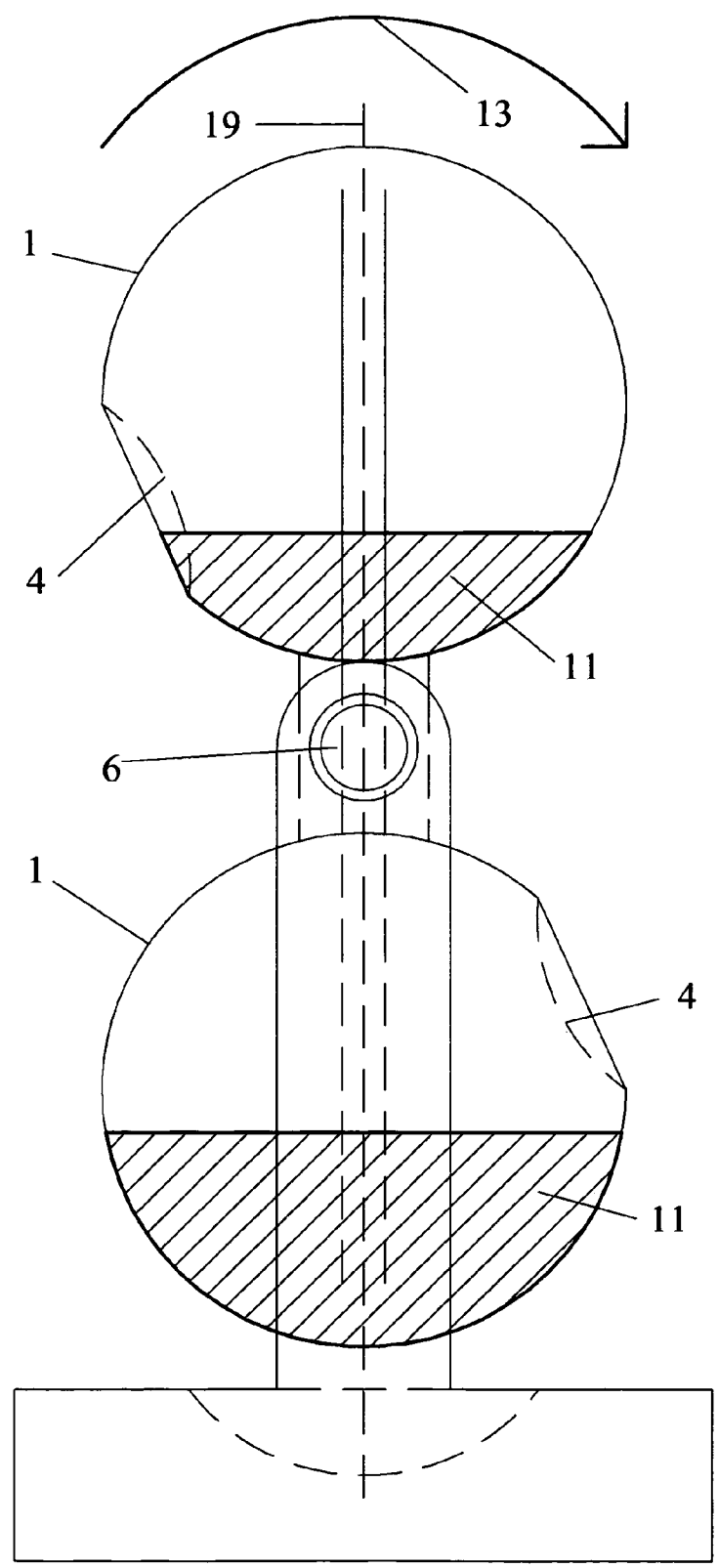
FIG. 2 is a side view of an enclosed vapor pressure rotational device illustrating an asymmetric chamber shape with respect to a vertical plane running through the two chambers.

FIG. 2 depicts the side view of the device to illustrate an asymmetric chamber shape with respect to a vertical plane 19 running lengthwise through a rotational shaft that defines the axis of rotation 6 and chambers 1, in the form of a dimple 4 to one side of each chamber. One chamber is positioned above the other. As a substantial amount of vaporizing medium in the form of a liquid 11 collects in the upper chamber by means described within the preceding paragraphs, more liquid will be situated to one side of the vertical plane than the other as a result of the asymmetric shape creating a weight imbalance. Gravity acting upon the imbalance within the upper chamber will create a moment of rotational force in the direction of the heavier side of the chamber, as indicated by the arrow 13. Each chamber is configured in such a way as to ensure that the weight imbalance always occurs on the same side of the vertical plane regardless of which chamber is positioned above to provide rotation in a single direction.

Figure 3:
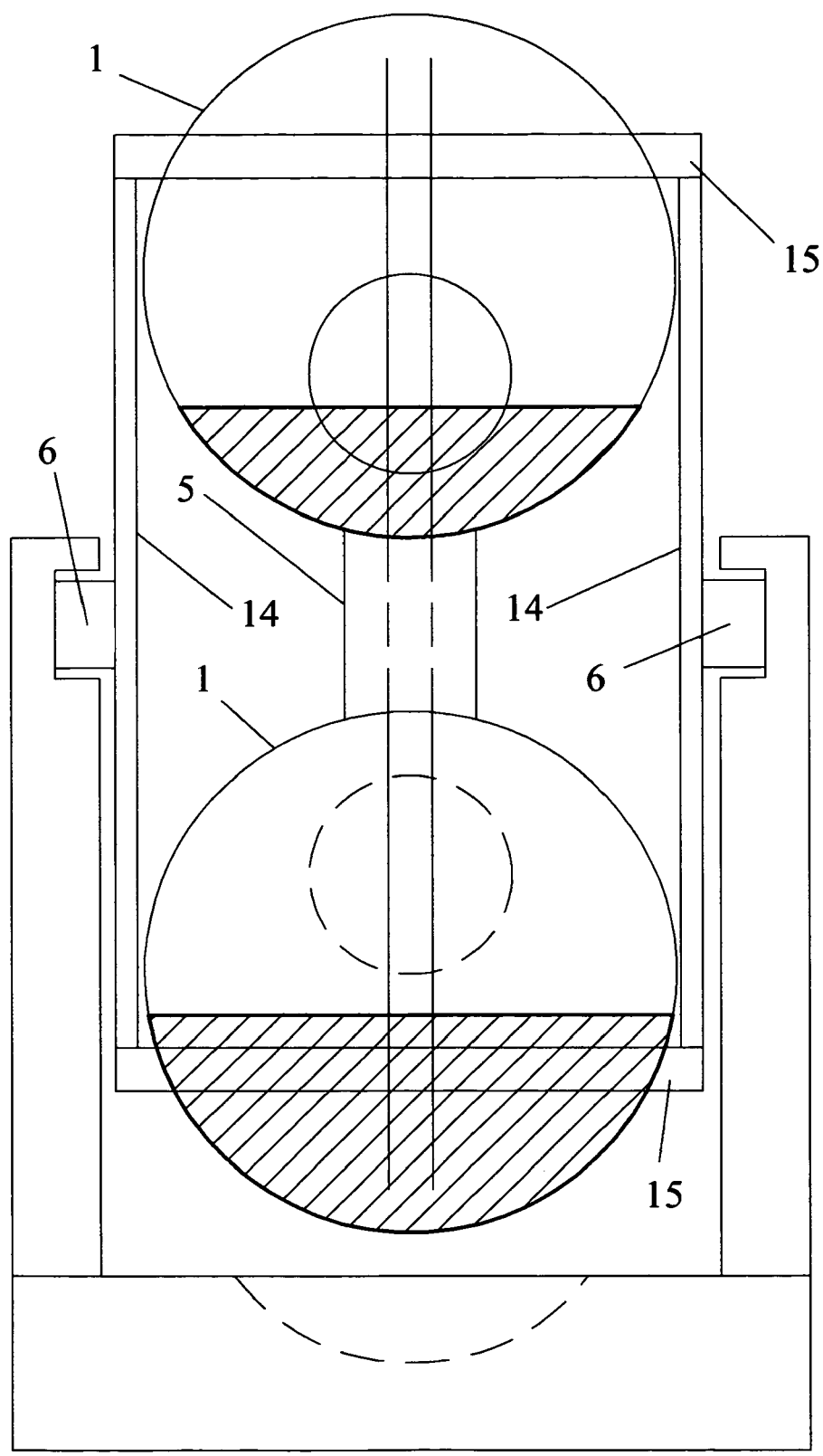
FIG. 3 is a frontal view of an alternate embodiment of an enclosed vapor pressure rotational device in which a shaft that defines the axis of rotation is maintained between the two chambers but not directly attached to the connecting hollow member.

FIG. 3 is a frontal view of an alternate configuration of an enclosed vapor pressure rotational device in which a rotational shaft that defines the axis of rotation 6 is connected to support arms 14 that are attached to connectors 15 affixed to each of the enclosed chambers 1. The figure illustrates the shaft maintained between the two chambers need not be directly attached to the connecting hollow member between the two chambers 5 for device operation.

Figure 4:
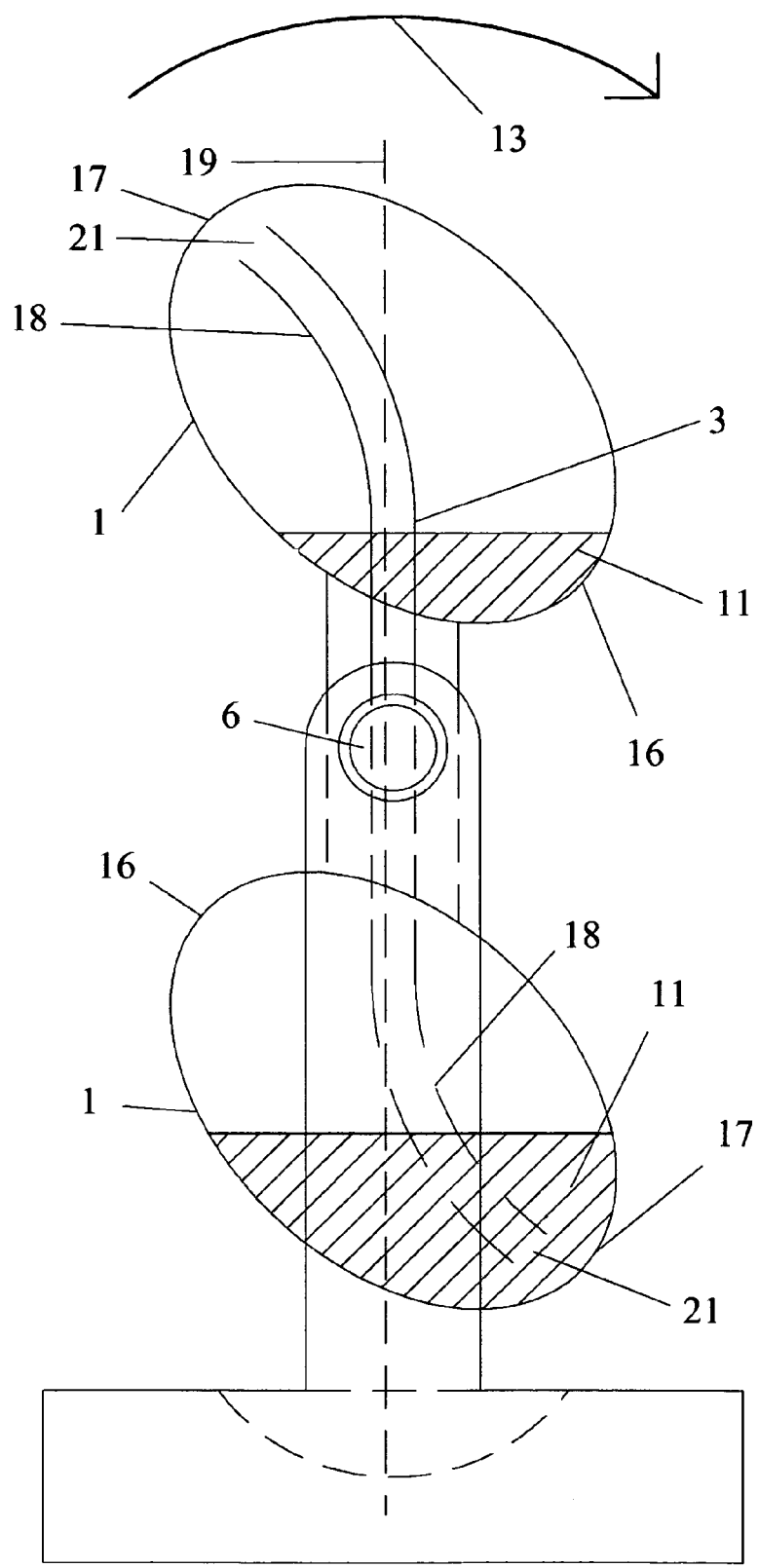
FIG. 4 is a side view of an alternate embodiment of an enclosed vapor pressure rotational device that illustrates an asymmetric chamber form with respect to a vertical plane running through the two chambers in which cavities protrude outward from each chamber instead of inward in addition to a bend in the connecting hollow member within each chamber.

FIG. 4 is a side view of an alternate configuration of an enclosed vapor pressure rotational device that illustrates an asymmetric form of the two chambers 1, one above the other, with respect to a vertical plane 19 running lengthwise through a rotational shaft that defines the axis of rotation 6 and said chambers in which outward facing bulges 16 closest to the axis of rotation toward the center of the device permit more liquid 11 to fill the upper chamber to one side of the vertical plane while opposing outward bulges 17 toward each end of the device enable liquid to evacuate the lower chamber in such a manner that more liquid remains on the same side of the vertical plane that contains the greater amount of liquid within the upper chamber. The opposing outward bulges work to enhance unidirectional rotation, as indicated by the arrow 13, by allowing gravity to have a greater effect by acting simultaneously upon both the upper and lower chambers to the same side of the vertical plane when a substantial amount of liquid has collected within the upper chamber. The drawing also illustrates a bend 18 in the connecting hollow member 3 within each chamber that enables more liquid to be communicated through the hollow member by allowing the end of the hollow member 21 to remain submerged within the liquid slightly longer during rotation.

The foregoing explanation of a preferred embodiment and alternate embodiments of the invention has been presented for the purposes of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto.

What is claimed is:

1. A mechanical toy comprising; two enclosed chambers, one designated as a lower chamber and the other as an upper chamber wherein each of the two enclosed chambers is asymmetrically constructed to ensure that when a weight imbalance occurs, the weight imbalance always occurs on a predetermined side of a vertical plane running through said chambers regardless of which chamber is positioned above to provide rotation in a single direction; a hollow member extending into each said chamber connecting said chambers to each other; a vaporizing medium contained within said enclosed chambers and said hollow connecting member; a rotational shaft attached about its center to said hollow member and chambers that runs lengthwise through said vertical plane and defines an axis of rotation between said chambers; support arms connected to said rotational shalt on either side of said hollow member and chambers at bearing points to provide 360-degree rotation; a base secured to said support arms; a heat source about said base to excite said vaporizing medium within said lower chamber to create an increase in vapor pressure within said lower chamber relative to said upper chamber that exerts force upon said vaporizing medium within said lower chamber to communicate said vaporizing medium through said hollow member into said upper chamber thereby creating the weight imbalance within said upper chamber on the predetermined side of the vertical plane that allows gravity to act upon said upper chamber when a substantial amount of said vaporizing medium has collected within said upper chamber pulling said upper chamber downward around said axis of rotation causing rotation in the single direction thereby switching the positions of the upper and lower chambers; said heat source excites the vaporizing medium within the lower chamber as after said rotation to provide reveal rotation in the single direction; said repeat rotation in the single direction produces 360-degree rotation.

2. A mechanical toy, set forth in claim 1, wherein said hollow member extends into each said chamber a distance just short of the internal surface of said chamber away from the points of entry of said chambers by said hollow member to provide maximum said communication of said vaporizing medium.

3. A mechanical toy, set forth in claim 1, wherein said enclosed chambers and said connecting hollow member arc substantially evacuated of air to provide a lower vaporizing temperature of said vaporizing medium.

4. An educational device comprising a pair of enclosed reservoirs connected by a tube extending into each said reservoir wherein said reservoirs are positioned in such a way that one said reservoir is situated above the other and wherein each of the two enclosed reservoirs is configured in such a way as to ensure that when a weight imbalance occurs, the weight imbalance always occurs on a predetermined side of a vertical plane running through said reservoirs regardless of which reservoir is positioned above to provide rotation in a single direction; a liquid with a low boiling point within said enclosed reservoirs and said tube; a rotational shaft centrally connected to said device defining an axis of rotation between the two said reservoirs and running lengthwise through said vertical plane; support arms connected at each end of said rotational shaft by bearing points to provide 360-degree rotation a base connected to said support arms; a heat source about said base acts upon said liquid within said lower reservoir to create a higher vapor pressure within said lower reservoir to act upon said liquid within said lower reservoir communicating said liquid through said tube into said upper reservoir; upon a substantial amount of said liquid vacating said lower reservoir, collecting in said upper reservoir thereby creating the imbalance on the predetermined side of the vertical plane that allows gravity to act upon said upper reservoir and pull said upper reservoir downward rotating said upper reservoir around said axis of rotation in the single direction; said rotation switches the positions of the upper and lower reservoirs, said heat source acting as upon the liquid within the lower reservoir following said rotation provides repeat rotation through 360 degrees in the single direction.

5. An educational device, set forth in claim 4, wherein said tube and said reservoirs are comprised of a light transmissive material to promote easy observation of the physical phenomenon.

* * * * *

UNITED STATES PATENT AND TRADEMARK OFFICE
CERTIFICATE OF CORRECTION

| | | |
|---|---|---|
| PATENT NO. | : 7,150,670 B2 | |
| APPLICATION NO. | : 11/031620 | |
| DATED | : December 19, 2006 | |
| INVENTOR(S) | : Edward Doran | |

It is certified that error appears in the above-identified patent and that said Letters Patent is hereby corrected as shown below:

1. Column 5, line 50, change the word "shalt" to the correct word, "shaft".
2. Column 6, line 9, change the word "reveal" to the correct word, "repeat".

Signed and Sealed this

Eighth Day of November, 2011

David J. Kappos
*Director of the United States Patent and Trademark Office*